United States Patent [19]
Gunning et al.

[11] Patent Number: 5,909,519
[45] Date of Patent: *Jun. 1, 1999

[54] METHOD FOR PRINTING PSEUDO-BOLD CHARACTERS AT ARBITRARY ORIENTATIONS, SCALING, AND RESOLUTIONS

[75] Inventors: Chris R. Gunning; Shane Konsella, both of Boise, Id.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/651,105

[22] Filed: May 21, 1996

[51] Int. Cl.$^6$ ................................. G06K 9/34; G06K 9/36
[52] U.S. Cl. .......................... 382/286; 395/171; 382/290; 382/178
[58] Field of Search ........................... 395/167, 168, 395/169, 170, 171; 382/178, 177, 183, 199, 266, 286, 290; 358/452, 470, 447

[56] References Cited

U.S. PATENT DOCUMENTS

| | | | |
|---|---|---|---|
| 5,003,304 | 3/1991 | Takinomi | 340/801 |
| 5,083,287 | 1/1992 | Obata et al. | 395/126 |
| 5,276,790 | 1/1994 | Lo | 395/142 |
| 5,579,416 | 11/1996 | Shibuya | 382/293 |
| 5,598,520 | 1/1997 | Harel | 395/169 |

*Primary Examiner*—Thomas D. Lee
*Assistant Examiner*—Jerome Grant, II

[57] ABSTRACT

A system and method of producing a bold character from a base character which has been transformed in orientation, size, or both, the method comprising overstriking the transformed character non-orthogonally, asymmetrically, or both, to produce the bold character. A preferred embodiment for overstriking the transformed character non-orthogonally, asymmetrically, or both, includes overstriking the transformed character relative to the CTM. Further, overstriking the transformed character relative to the CTM preferably includes (a) determining a multistrike quantity representative of a number of offset overstrikes, (b) determining a horizontal vector and a vertical vector, relative to the fixed reference point, based on the multistrike quantity, (c) transforming the horizontal vector into a transformed horizontal vector and the vertical vector into a transformed vertical vector, using the CTM, and (d) overstriking the transformed character at points along the transformed horizontal vector and transformed vertical vector to produce the bold character.

13 Claims, 7 Drawing Sheets

… (n,0). Then the conventional multistrike method repeats the process with the intermediate bitmap, overstriking it n times along the Y-axis, which creates the pseudo-bold character. That is, the resulting intermediate bitmap is overstruck at (0,1), (0,2), . . . , (0,n).

METHOD FOR PRINTING PSEUDO-BOLD CHARACTERS AT ARBITRARY ORIENTATIONS, SCALING, AND RESOLUTIONS

FIELD OF THE INVENTION

This invention relates in general to imaging technology and, more specifically, to producing bold characters at arbitrary orientations and sizes.

BACKGROUND OF THE INVENTION

Far East fonts are very large compared to fonts for western languages. There can be as many as 30 times as many characters in a Japanese, Korean, or Traditional or Simplified Chinese font as in a font containing just Latin 1, 2, and 5 character sets. Computer products such as operating systems and printers which contain western fonts usually include complete font families, i.e., base, italic, bold, and bold italic. However, products containing Far East fonts frequently only include the base fonts but do not include complete font families, due to the large size, cost, and time required to design those fonts. These products usually implement algorithmic enhancements (e.g., shearing, double-striking) to create italic and bold characters. Character glyphs created this way are not typographically correct but are adequate for most users of these products. For purposes of this discussion, bold character glyphs created by algorithmic means will be referred to as "pseudo-bold" characters.

Prior approaches to creating pseudo-bold characters include double striking and multistriking of the base characters. In the double-strike approach, a character is printed twice, once at the normal position and once offset one pixel to the right. This solution is common in low-resolution devices such as dot-matrix printers and video display drivers. The disadvantage of this solution is that it does not adjust for variable point size and resolution. As a result, on high-resolution devices or at large point sizes, a double-struck character is not noticeably bolder than the original character.

In the multistrike approach, the character is overstruck multiple times with variable offsets in the horizontal (X) and vertical (Y) directions. The number of times a character is overstruck in each direction is proportional to its point size and the resolution of the device. For example, if a 10-point character on a 300 dots per inch (dpi) device is overstruck 2 times in both the X and Y directions, then a 20-point character at 300 dpi would be overstruck 4 times (double point size) and a 10-point character at 600 dpi would also be overstruck 4 times (double resolution.)

In a typical multistrike implementation for a printer, the pseudo-bold character is constructed as a bitmap image in RAM before it is printed. The process of creating a pseudo-bold character starts with the original (base) character as a bitmap image. A temporary memory block large enough to hold the base character overstruck n times in the X direction (where n is the multistrike quantity) is allocated. Then the base character is copied into the temporary memory block n times offset by one pixel to the right each time. This has the effect of overstriking the character n times to the right. Then a new memory block large enough to hold the pseudo-bold character is allocated. Then the image in the temporary memory block is copied into the new memory block n times offset by one pixel up each time. The new memory block now holds the pseudo-bold character ready for printing, and the temporary memory block is deallocated.

Stated otherwise, for example, using pixel coordinates where x increases to the right and y increases toward the top of the page, assume the base character is printed at (0,0). The conventional multistrike method overstrikes a base character n times along the X-axis, moving the character one pixel to the right with each overstrike, resulting in an intermediate bitmap. That is, the character is overstruck at (1,0), (2,0), . . . , (n,0). Then the conventional multistrike method repeats the process with the intermediate bitmap, overstriking it n times along the Y-axis, which creates the pseudo-bold character. That is, the resulting intermediate bitmap is overstruck at (0,1), (0,2), . . . , (0,n).

The conventional multistrike method is limited. For non-orthogonal orientations or asymmetrical scaling of the base character, the multistrike method produces a pseudo-bold character which is not true to the shape of the base character.

Accordingly, objects of the present invention are to provide a new system and method for creating pseudo-bold characters at arbitrary orientations (including non-orthogonal orientations), scaling (including non-asymmetric scaling), point sizes, and device resolutions.

SUMMARY OF THE INVENTION

According to principles of the present invention in a preferred embodiment, a system and method are disclosed for producing a bold character from a base character which has been transformed in orientation, size, or both, the method comprising overstriking the transformed character non-orthogonally, asymmetrically, or both, to produce the bold character. A preferred embodiment for overstriking the transformed character non-orthogonally, asymmetrically, or both, includes overstriking the transformed character relative to a predetermined coordinate transformation matrix (CTM). Further, overstriking the transformed character relative to the CTM preferably includes (a) determining a multistrike quantity representative of a number of offset overstrikes, (b) determining a horizontal vector and a vertical vector, relative to a fixed reference point, based on the multistrike quantity, (c) transforming the horizontal vector into a transformed horizontal vector and the vertical vector into a transformed vertical vector, using the CTM, and (d) overstriking the transformed character at points along the transformed horizontal vector and transformed vertical vector to produce the bold character.

Other objects, advantages, and capabilities of the present invention will become more apparent as the description proceeds.

DETAILED DESCRIPTION OF THE INVENTION

Any combination of scaling, rotation, and translation of a 2-dimensional image, such as a character, can be represented by a 3×3 coordinate transformation matrix (CTM). For example, the following CTM will create a double-width character, i.e., stretch it to make it twice as wide as the original character:

$$\begin{bmatrix} 2 & 0 & 0 \\ 0 & 1 & 0 \\ 0 & 0 & 1 \end{bmatrix}$$

The following CTM will rotate a character clockwise by θ degrees:

$$\begin{bmatrix} \cos\theta & -\sin\theta & 0 \\ \sin\theta & \cos\theta & 0 \\ 0 & 0 & 1 \end{bmatrix}$$

Any combination of scaling and rotation without translation can be represented by the following CTM:

$$\begin{bmatrix} a & c & 0 \\ b & d & 0 \\ 0 & 0 & 1 \end{bmatrix}$$

An arbitrary point (x, y) can be represented as a vector [x y 1] and transformed by the previous CTM to (x', y') as follows:

$$[x'\ y'\ 1] = [x\ y\ 1] \begin{bmatrix} a & c & 0 \\ b & d & 0 \\ 0 & 0 & 1 \end{bmatrix}$$

$$= [ax + by\ cx + dy\ 1]$$

This result is used to achieve the multistrike method of the present invention.

Figure 1:
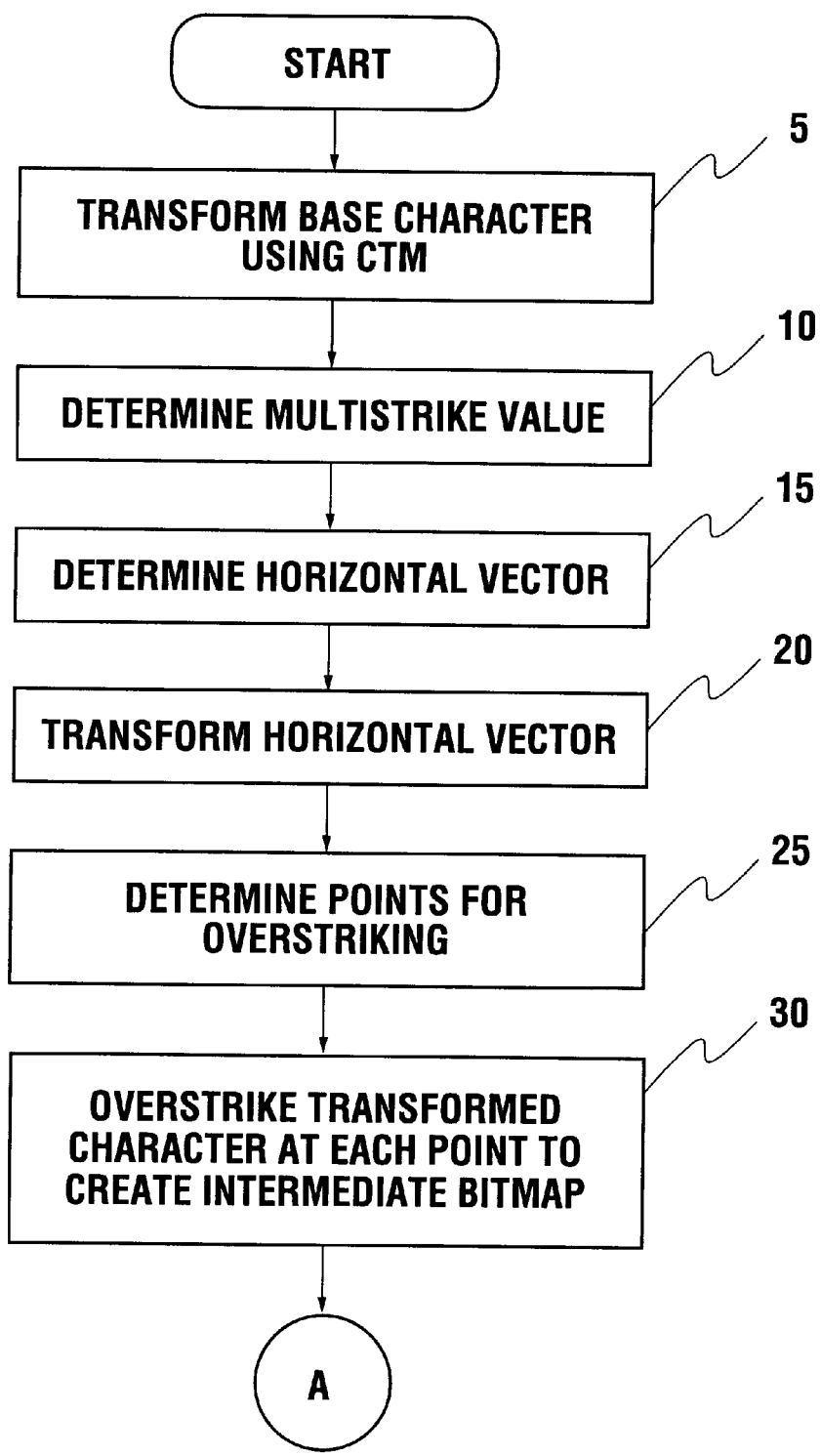
FIGS. 1–2 show a flow chart depicting a preferred method of the present invention of producing a pseudo-bold character.
Figure 2:
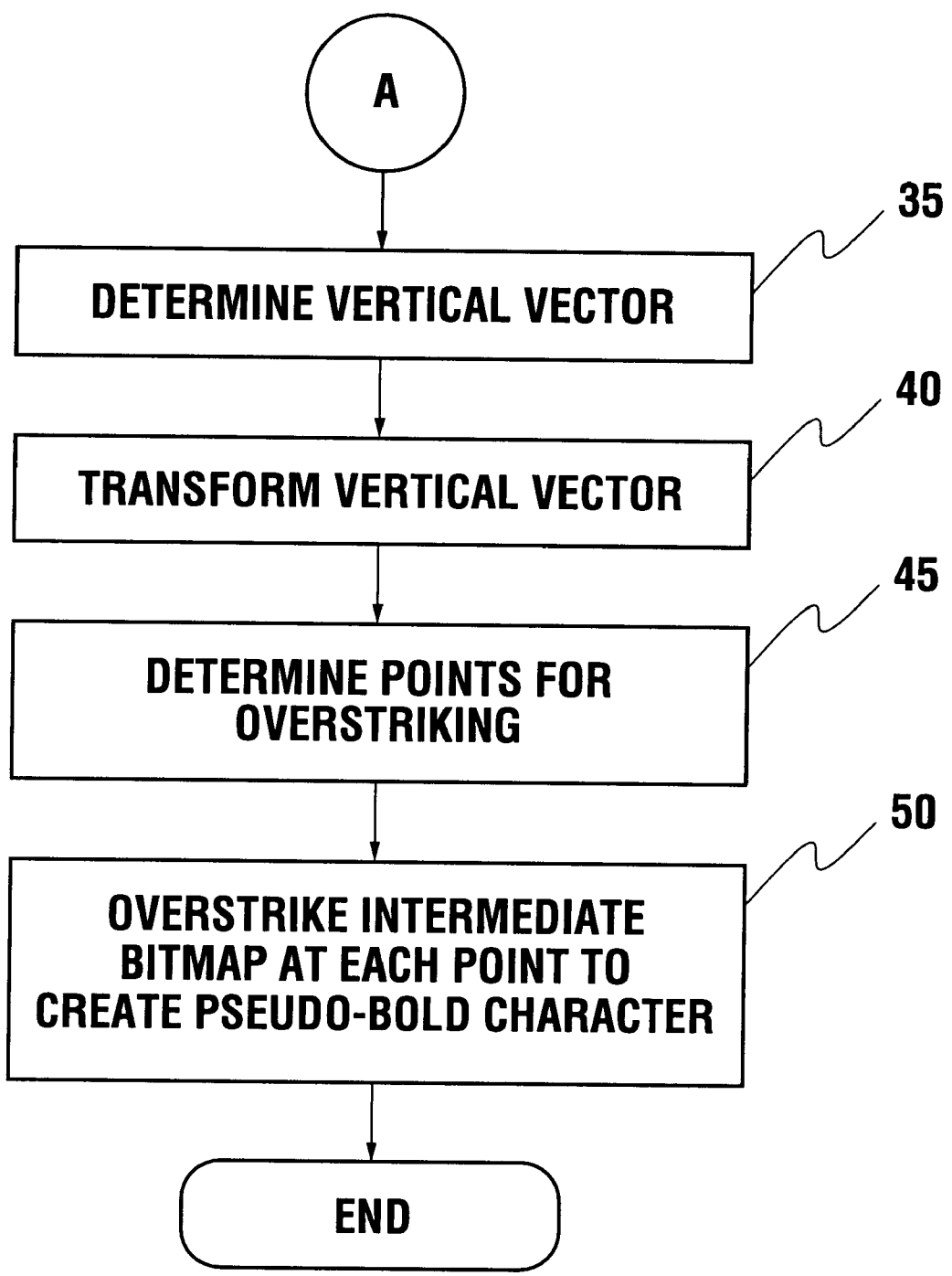

FIGS. 1–2 show a flow chart depicting a preferred method of the present invention for producing a pseudo-bold character transformed in orientation, size, or both, relative to its base character. In the first step, a base character is transformed 5 in orientation, size, or both, using a predetermined CTM to produce a transformed character. The base character is transformed relative to a fixed reference point, for example, (0,0). A multistrike quantity "n" is then determined 10. The multistrike quantity is the number of times the base character is to be overstruck in the conventional multistrike method. Factors such as point size and resolution are used to determine the multistrike quantity. For example, a multistrike quantity of between 4 and 6 is typical for a 10-point character at 600 dots per inch (dpi).

Next, a horizontal vector is determined 15. The horizontal vector is the vector between the fixed reference point (i.e., 0,0 in this example) and a point offset n pixels along the X-axis (n,0). The horizontal vector is then transformed 20 by the CTM to produce a transformed horizontal vector. The endpoint of the transformed horizontal vector is (an,cn). Subsequently, points are determined 25 at intervals along the transformed horizontal vector for overstriking purposes. Although, the points along the transformed horizontal vector may be calculated in a variety of ways, in a preferred embodiment, a simple digital differential analyzer (DDA) is used. Bresenham's algorithm produces one such simple DDA, as conventional in the art.

An intermediate bitmap is created by overstriking 30 the transformed character with an overstrike bitmap character at the points determined along the transformed horizontal vector. Each overstrike character is referenced relative to a respective point along the transformed horizontal vector in the same manner that the base character is referenced relative to the fixed reference point.

Next, a vertical vector is determined 35. The vertical vector is the vector between the fixed reference point (0,0) and a point offset n pixels along the Y-axis (0,n). The vertical vector is transformed 40 by the CTM to produce a transformed vertical vector. The endpoint of the transformed vertical vector is (bn,dn). Points are then determined 45 at intervals along the transformed vertical vector for overstriking purposes. The points along the transformed vertical vector are preferably calculated in the same manner as for the horizontal vector.

Finally, a transformed bold character is created by overstriking 50 the intermediate bitmap with an overstrike bitmap at the points determined along the transformed vertical vector. Each overstrike bitmap is referenced relative to a respective point along the transformed vertical vector in the same manner that the base character is referenced relative to the fixed reference point.

It should be noted that the order in which the steps of this method are accomplished may be varied to achieve the same result. For instance, both the horizontal and vertical vectors may be determined before either vector is transformed. Also, the intermediate bitmap may be created by overstriking the transformed character at points along the transformed vertical vector, with the bold character created by overstriking the intermediate bitmap at points along the transformed horizontal vector.

FIGS. 3 A–E and 4 A–E represent a magnified letter "H" as its orientation is changed and then as it is bolded. FIGS. 3 A–E demonstrate conventional technology for producing a pseudo-bold character for comparison with the present invention. FIGS. 4 A–E demonstrate a pseudo-bold character produced using the present invention. The figures demonstrate the relative ability of each technology to produce an image which is typographically correct.

Figure 3B:
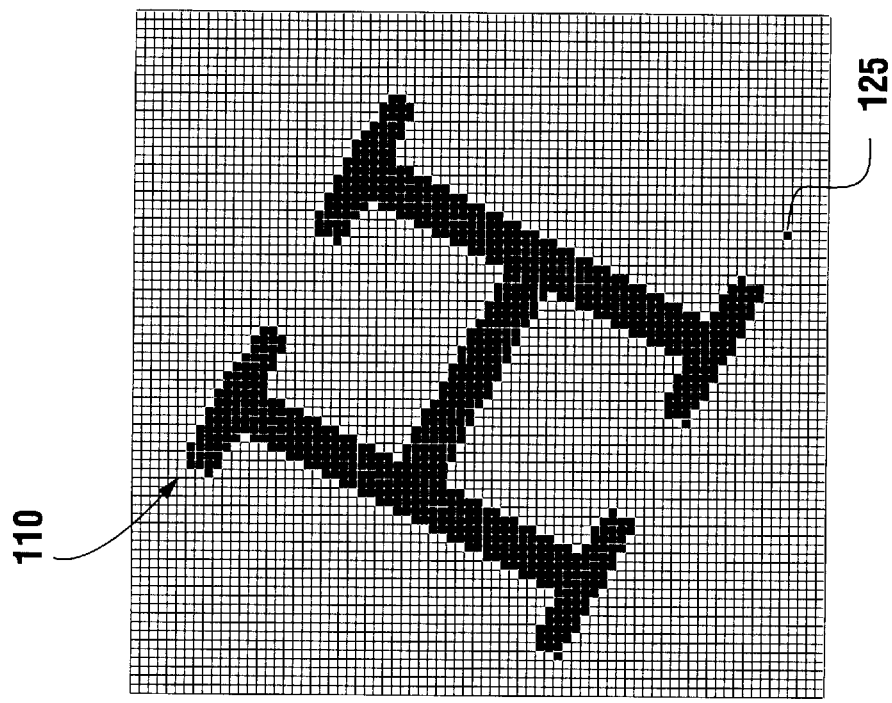
FIGS. 3 A–E represent a magnified letter "H" as its orientation is changed and then as it is bolded using the conventional multistrike method.
Figure 3A:
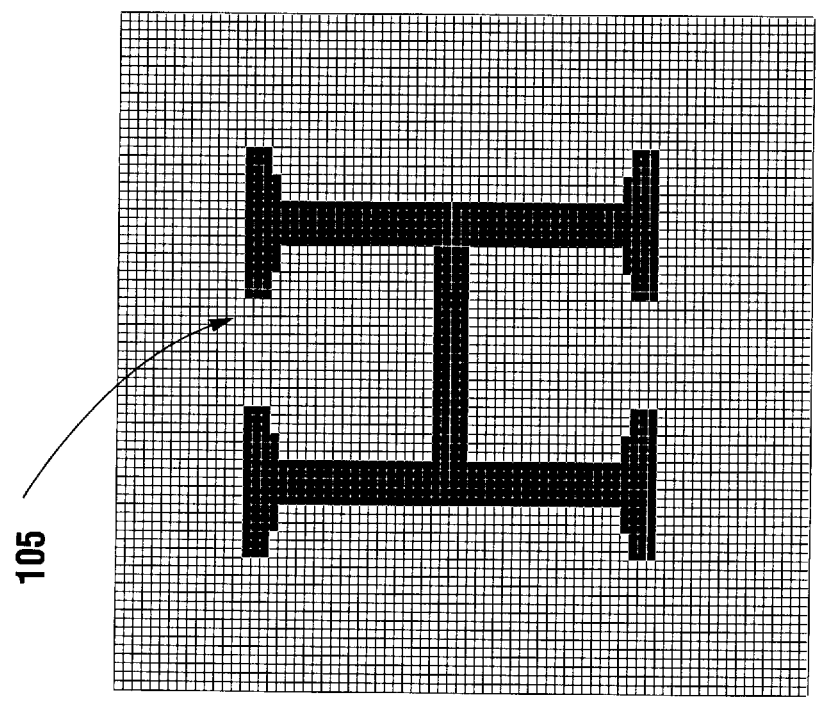

Referring to FIG. 3A, the upright "H" 105 represents a letter "H" magnified to show detail. The tilted "H" 110 of FIG. 3B shows a non-orthogonal "H" which may be produced from "H" 105 using a conventional CTM. In FIG. 3C, "H" 115 represents an intermediate bitmap produced from "H" 110 and shows how conventional technology bolds non-orthogonal characters (i.e., tilted "H" 110) by overstriking the tilted "H" 110 offset one pixel along the horizontal direction (to the right) from the original tilted "H" 110 for each overstrike. The horizontal direction is orthogonally to the right relative to a fixed coordinate/reference system associated with the original base character 105. In this example, the tilted "H" 110 is overstruck four times to produce the intermediate bitmap 115. Note how a reference pixel 125 in FIG. 3B is transformed into a horizontal line 145 in FIG. 3C.

Figure 3E:
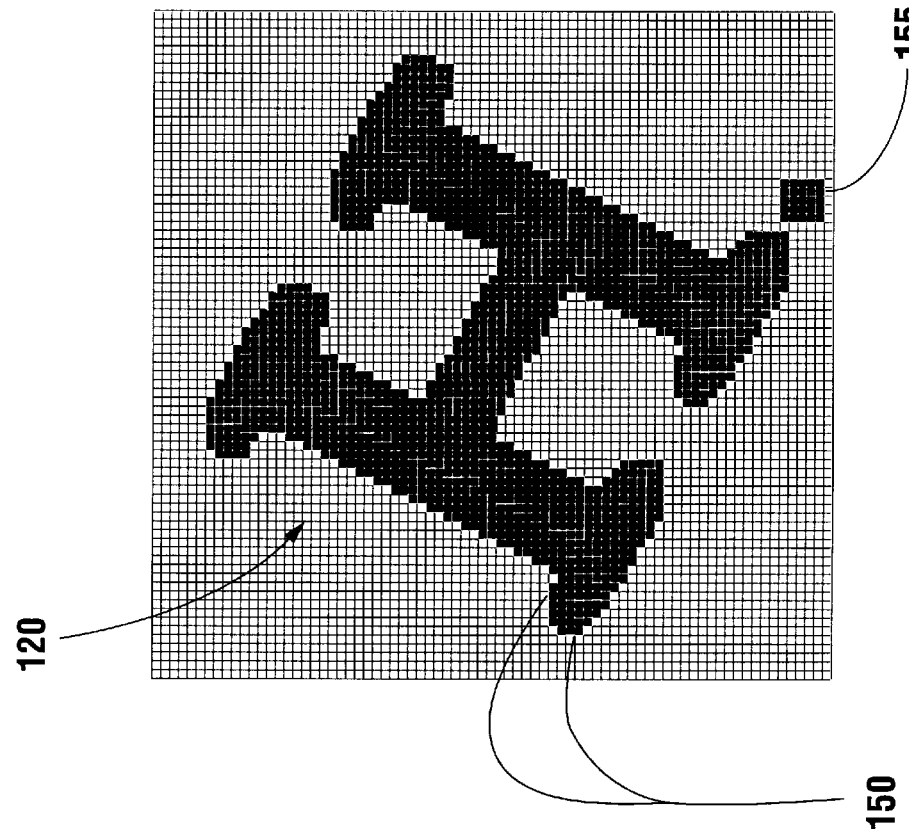
Figure 3C:
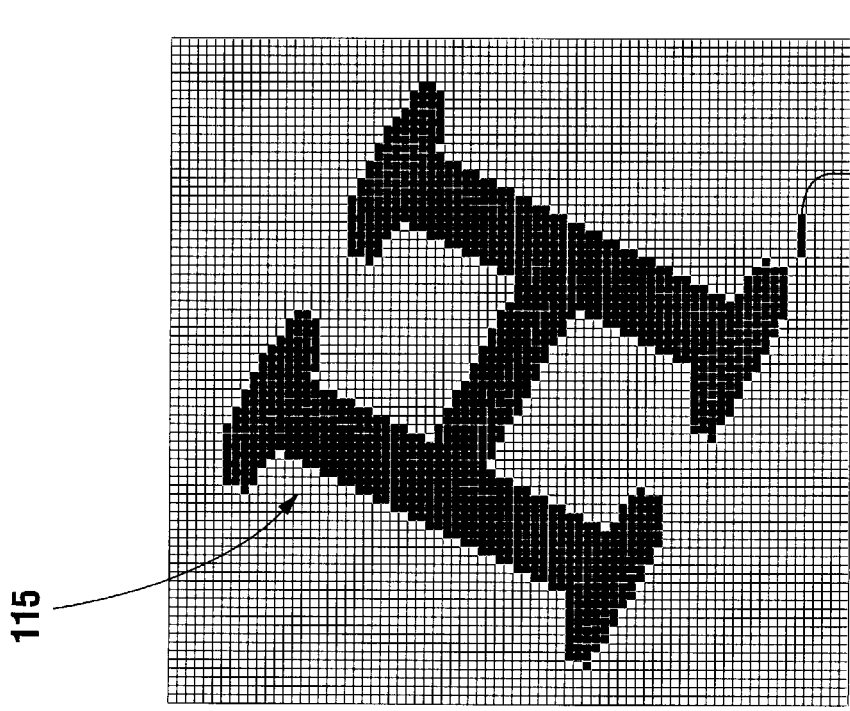
Figure 3D:
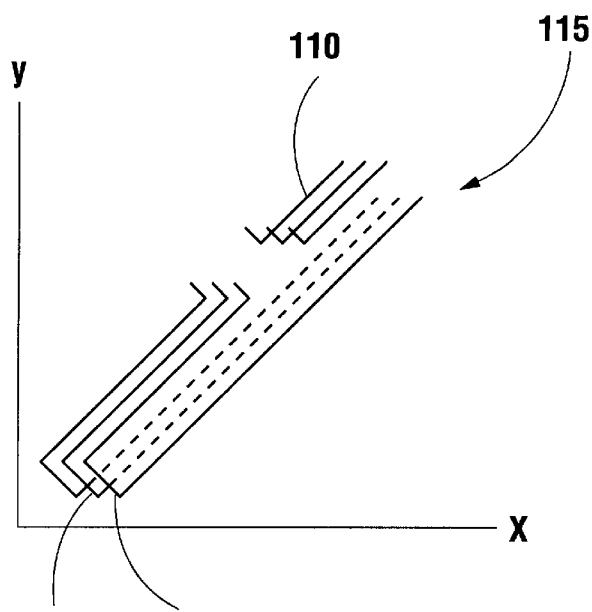

An even further magnified, partial detail of "H" 115 of FIG. 3C is shown in FIG. 3D. Only the lower portion of the right leg of "H" 115 is shown. For the purpose of clarity, FIG. 3D is not drawn to scale and simply shows the general trend of the overstrikes 135, 140 in reference to the transformed character 110 (only two overstrikes 135, 140 are shown). However, it can be clearly seen how transformed "H" 110 is bolded along the orthogonal X-axis with two overstrikes labeled as 135 and 140 to produce "H" 115.

The intermediate bitmap 115 is then overstruck offset along the vertical direction (orthogonally toward the top of the page) from the original intermediate bitmap 115 for each overstrike as shown in "H" 120 of FIG. 3E. In this example, the intermediate bitmap 115 is overstruck four times (vertically) to produce a fully bolded character 120. The fully bolded "H" 120 shows the result of using conventional technology to produce a pseudo-bold non-orthogonal character. Note the bolded reference pixel 155 which appears to be bolded in the orthogonal direction. Also note portions 150 of the pseudo-bold character 120 which appear to be squared off in the orthogonal direction. These represent clear disadvantages of the conventional overstriking technology.

Figure 4B:
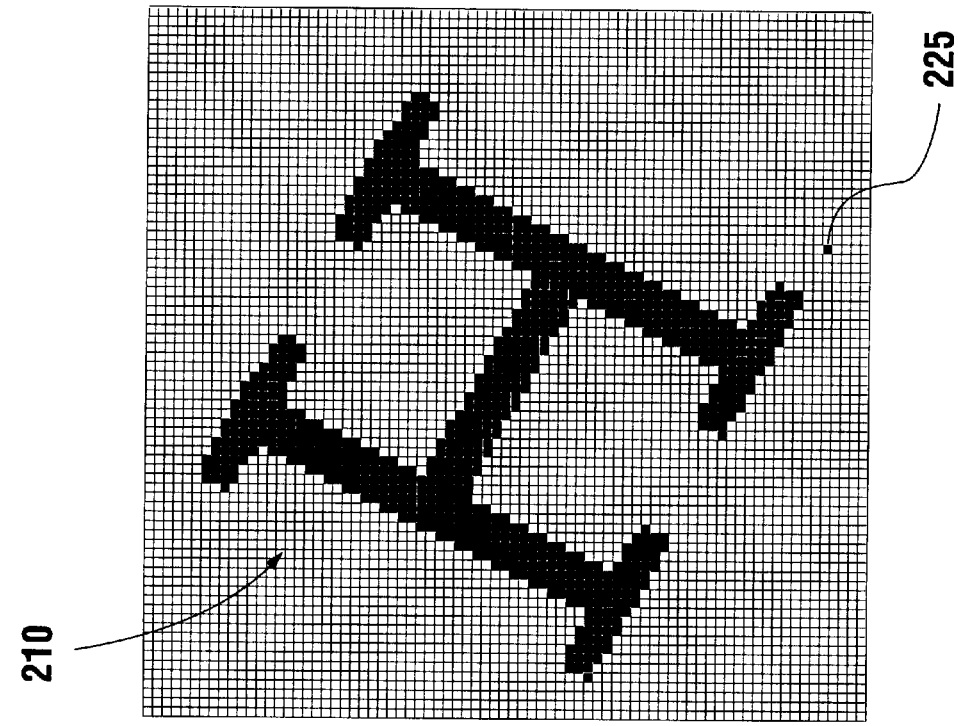
FIGS. 4 A–E represent a magnified letter "H" as its orientation is changed and then as it is bolded using the method of the present invention.
Figure 4A:
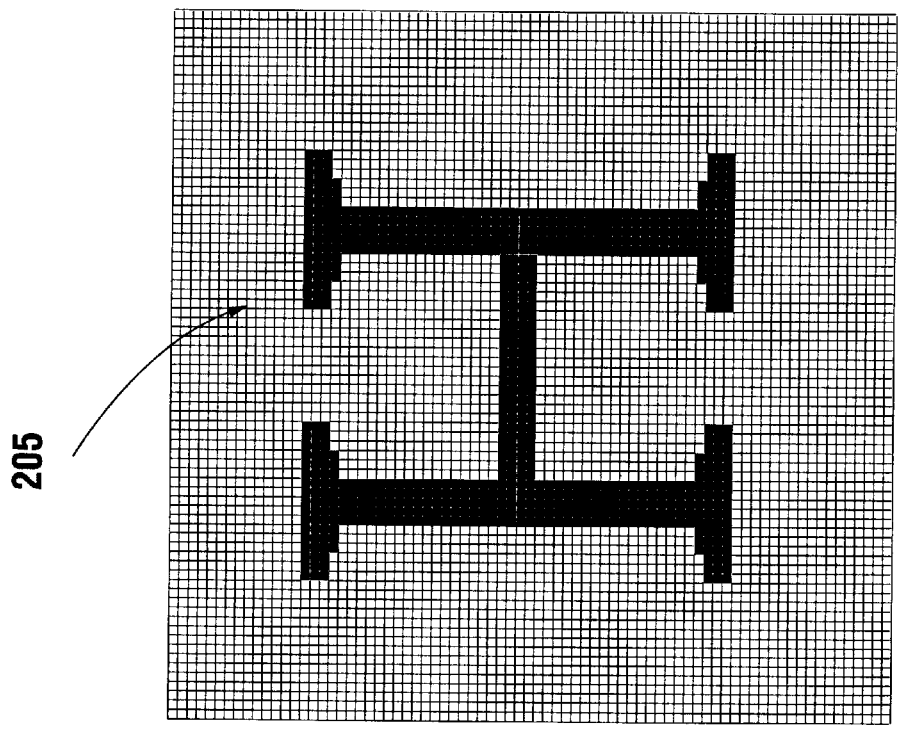

Referring now to FIG. 4A, the upright "H" 205 again represents a letter "H" magnified to show detail. The tilted "H" 210 of FIG. 4B again shows a non-orthogonal "H" which may be produced from "H" 205 using a conventional CTM. The intermediate bitmap 215 of FIG. 4C shows how the present invention method bolds the non-orthogonal character by overstriking the tilted "H" 210 offset along the transformed horizontal direction non-orthogonally from the original tilted "H" 210 for each overstrike. The transformed horizontal direction is referenced relative to the tilted "H" 210 in the same manner as the horizontal direction is referenced relative to the upright "H" 205. In this example, the tilted "H" 210 is overstruck four times to produce the intermediate bitmap 215. Note how a reference pixel 225 in FIG. 4B is transformed into a diagonal line 245 in FIG. 4C. Diagonal line 245 is angled relative to the horizontal direction by the same amount that the upright "H" 205 is rotated to produce tilted "H" 210. This contrasts with the horizontal line 145 in FIG. 3C and clearly shows how the present invention is improved over the prior art An even further magnified, partial detail of "H" 215 of FIG. 4C is shown in FIG. 4D. Only the lower portion of the right leg of "H" 215 is shown. For the purpose of clarity, FIG. 4D is not drawn to scale and simply shows the general trend of the overstrikes 235, 240 in reference to the transformed character 210 (only two overstrikes 235, 240 are shown). However, it can be clearly seen how transformed "H" 210 is bolded along the non-orthogonal transformed horizontal direction with two overstrikes labeled as 235 and 240 to produce "H" 215.

Figure 4E:
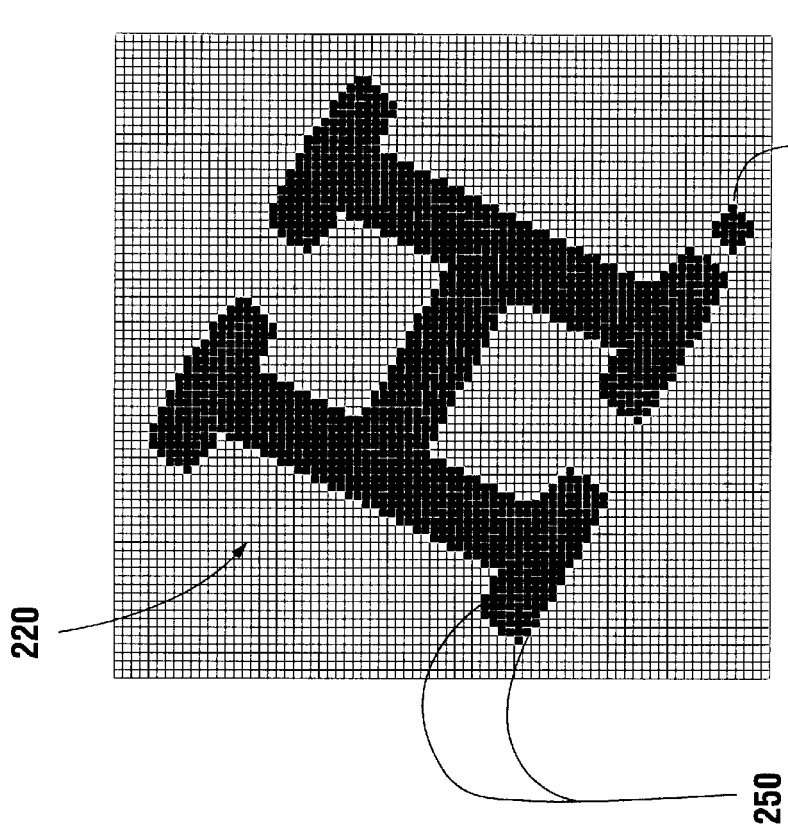
Figure 4C:
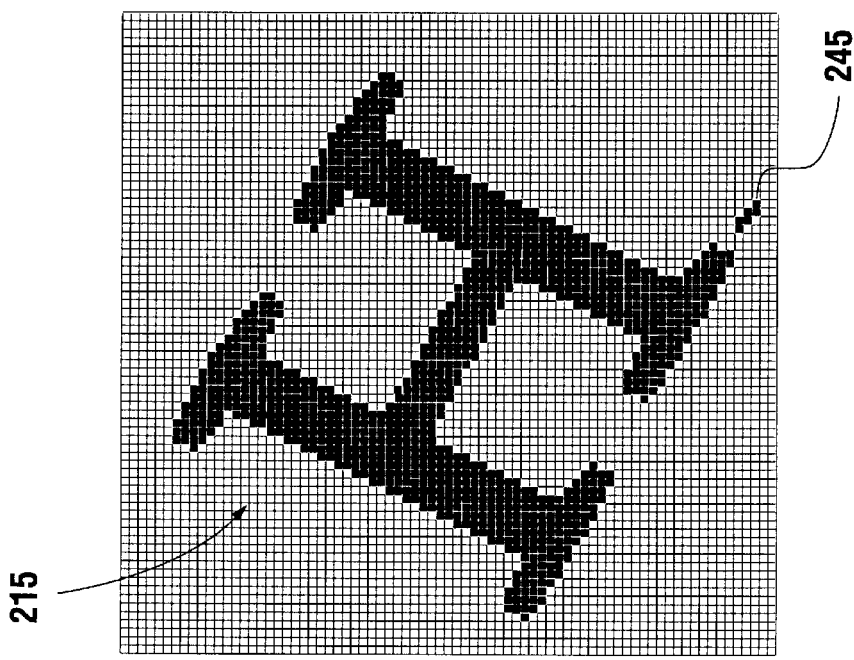
Figure 4D:
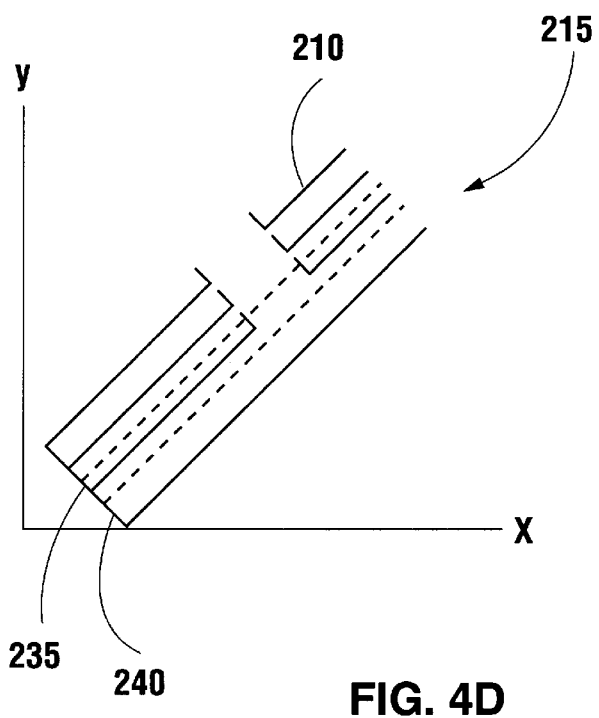

The intermediate bitmap 215 is then overstruck offset along the transformed vertical direction non-orthogonally from the original intermediate bitmap 215 for each overstrike as shown in "H" 220 of FIG. 4E. The transformed vertical direction is referenced relative to the tilted "H" 210 in the same manner as the vertical direction is referenced relative to the upright "H" 205. In this example, the intermediate bitmap 215 is overstruck four times (non-orthogonally vertically) to produce a fully bolded character 220. The fully bolded "H" 220 shows the result of using the present invention to produce a pseudo-bold non-orthogonal character. Note the bolded reference pixel 255 which is angled in the same direction as the bolded "H" 220. Also note portions 250 of the pseudo-bold character 220 which are squared off in the transformed horizontal and transformed vertical directions which correspond to the angle which pseudo-bold character 220 is rotated. This character is clearly improved over the prior art of FIG. 3.

The multistrike method of the present invention will produce a pseudo-bold character from any base character which has been transformed using any CTM. This includes CTMs which transform a base character asymmetrically, i.e., the height of the transformed character is not proportionally the same as the width of the transformed character in reference to the height and width of the base character. The number of overstrikes in the horizontal direction will be proportional to the width of the transformed character, and the number of overstrikes in the vertical direction will be proportional to the height of the transformed character. This is in contrast with the conventional multistrike method which overstrikes the transformed character the same number of times in the horizontal direction as it does the vertical direction. If the base character has been rotated in addition to being asymmetrically scaled, the horizontal direction and the vertical direction, for the purpose of overstriking, are relative to the rotated character.

In summary, what has been described above are the preferred embodiments of a system and method for producing a pseudo-bold character at arbitrary orientations and scalings. Namely, the present invention produces a pseudo-bolded character which is more true to the shape of the original character when the original character has been rotated non-orthogonally or scaled asymmetrically. This invention is suitable for all image producing devices, including printers and video displays. As such, it will be obvious that the present invention is easily implemented utilizing any of a variety of hardware and/or software existing in the art. Furthermore, while the present invention has been described by reference to specific embodiments, it will be obvious that other alternative embodiments and methods of implementation or modification may be employed without departing from the true spirit and scope of the invention.

what is claimed is:

1. A method of producing a bold character from a base character which has been transformed in orientation, size, or both, to produce a transformed character, the method comprising overstriking the transformed character non-orthogonally relative to a fixed reference system associated with the base character, asymmetrically, or both, to produce the bold character, wherein overstriking the transformed character includes providing a copy of the transformed character over the transformed character and offset at least one pixel for each overstrike.

2. The method of claim 1 wherein overstriking the transformed character non-orthogonally includes overstriking the transformed character non-orthogonally relative to a horizontal direction of the fixed reference system and non-orthogonally relative to a vertical direction of the fixed reference system.

3. The method of claim 1 wherein overstriking the transformed character asymmetrically includes overstriking the transformed character a different number of times in a horizontal direction, relative to the transformed character, than in a vertical direction, relative to the transformed character.

4. The method of claim 1 wherein the transformed character is produced from the base character using a coordinate transformation matrix (CTM) and wherein overstriking the transformed character non-orthogonally, asymmetrically, or both, includes overstriking the transformed character by using the CTM.

5. The method of claim 4 wherein the base character is referenced relative to a fixed reference point and wherein overstriking the transformed character by using the CTM includes:

(a) determining a multistrike quantity representative of a number of offset overstrikes;

(b) determining a horizontal vector and a vertical vector, relative to the fixed reference point, based on the multistrike quantity;

(c) transforming the horizontal vector into a transformed horizontal vector and the vertical vector into a transformed vertical vector, using the CTM; and, (d) overstriking the transformed character at points along the transformed horizontal vector and transformed vertical vector to produce the bold character.

6. The method of claim 5 wherein overstriking the transformed character at points along the transformed horizontal vector and transformed vertical vector includes:

(a) determining a first set of points along, selectively, the transformed horizontal vector, or the transformed vertical vector;

(b) overstriking the transformed character to produce an overstrike character at each of the first set of points, each overstrike character referenced relative to a respective point of the first set of points in the same manner that the base character is referenced relative to the fixed reference point, the overstriking of the transformed character to produce an intermediate bitmap;

(c) determining a second set of points along, selectively, (i) the transformed vertical vector in the event the first set of points is determined along the transformed horizontal vector, or (ii) the transformed horizontal vector in the event the first set of points is determined along the transformed vertical vector; and, (d) overstriking the intermediate bitmap to produce an overstrike bitmap at each of the second set of points, each overstrike bitmap referenced relative to a respective point of the second set of points in the same manner that the base character is referenced relative to the fixed reference point, the overstriking of the intermediate bitmap to produce the bold character.

7. A method of producing a bold character from a base character, the base character referenced relative to a fixed reference point, the method comprising:

(a) transforming the base character in orientation, size, or both, relative to the fixed reference point, into a transformed character using a coordinate transformation matrix (CTM);

(b) determining a multistrike quantity representative of a number of offset overstrikes;

(c) determining a horizontal vector and a vertical vector, relative to the fixed reference point, based on the multistrike quantity;

(d) transforming the horizontal vector into a transformed horizontal vector and the vertical vector into a transformed vertical vector, using the CTM;

(e) determining a first set of points along, selectively, the transformed horizontal vector, or the transformed vertical vector;

(f) overstriking the transformed character to produce an overstrike character at each of the first set of points, each overstrike character referenced relative to a respective point of the first set of points in the same manner that the base character is referenced relative to the fixed reference point, the overstriking of the transformed character to produce an intermediate bitmap;

(g) determining a second set of points along, selectively, (i) the transformed vertical vector in the event the first set of points is determined along the transformed horizontal vector, or (ii) the transformed horizontal vector in the event the first set of points is determined along the transformed vertical vector; and, (h) overstriking the intermediate bitmap to produce an overstrike bitmap at each of the second set of points, each overstrike bitmap referenced relative to a respective point of the second set of points in the same manner that the base character is referenced relative to the fixed reference point, the overstriking of the intermediate bitmap to produce the bold character.

8. A system for producing a bold character from a base character which has been transformed in orientation, size, or both, to produce a transformed character, the system comprising means for overstriking the transformed character non-orthogonally relative to a fixed reference system associated with the base character, asymmetrically, or both, to produce the bold character, wherein the means for overstriking the transformed character includes means for providing a copy of the transformed character over the transformed character and offset at least one pixel for each overstrike.

9. The system of claim 8 wherein the means for overstriking the transformed character non-orthogonally includes means for overstriking the transformed character non-orthogonally relative to a horizontal direction of the fixed reference system and non-orthogonally relative to a vertical direction of the fixed reference system.

10. The system of claim 8 wherein the means for overstriking the transformed character asymmetrically includes means for overstriking the transformed character a different number of times in a horizontal direction, relative to the transformed character, than in a vertical direction, relative to the transformed character.

11. The system of claim 8 wherein the transformed character is produced from the base character using a coordinate transformation matrix (CTM) and wherein the means for overstriking the transformed character non-orthogonally, asymmetrically, or both, includes means for overstriking the transformed character by using the CTM.

12. The system of claim 11 wherein the base character is referenced relative to a fixed reference point and wherein the means for overstriking the transformed character by using the CTM includes:

(a) means for determining a multistrike quantity representative of a number of offset overstrikes;

(b) means for determining a horizontal vector and a vertical vector, relative to the fixed reference point, based on the multistrike quantity;

(c) means for transforming the horizontal vector into a transformed horizontal vector and the vertical vector into a transformed vertical vector, using the CTM; and, (d) means for overstriking the transformed character at points along the transformed horizontal vector and transformed vertical vector to produce the bold character.

13. The system of claim 12 wherein the means for overstriking the transformed character at points along the transformed horizontal vector and transformed vertical vector includes:

(a) means for determining a first set of points along, selectively, the transformed horizontal vector, or the transformed vertical vector;

(b) means for overstriking the transformed character to produce an overstrike character at each of the first set of points, each overstrike character referenced relative to a respective point of the first set of points in the same manner that the base character is referenced relative to the fixed reference point, the overstriking of the transformed character to produce an intermediate bitmap;

(c) means for determining a second set of points along, selectively, (i) the transformed vertical vector in the event the first set of points is determined along the transformed horizontal vector, or (ii) the transformed horizontal vector in the event the first set of points is determined along the transformed vertical vector; and, (d) means for overstriking the intermediate bitmap to produce an overstrike bitmap at each of the second set of points, each overstrike bitmap referenced relative to a respective point of the second set of points in the same manner that the base character is referenced relative to the fixed reference point, the overstriking of the intermediate bitmap to produce the bold character.

* * * * *